US012013407B2

(12) United States Patent
Gisler et al.

(10) Patent No.: US 12,013,407 B2
(45) Date of Patent: Jun. 18, 2024

(54) LABORATORY SYSTEM FOR AUTOMATICALLY PROCESSING BIOLOGICAL SAMPLES

(71) Applicant: Roche Molecular Systems, Inc., Pleasanton, CA (US)

(72) Inventors: Andreas Gisler, Thalwil (CH); Mike Mohns, Kriens (CH); Vijay Namasivayam, Lucerne (CH); Maren Christin Wolff, Zurich (CH); Devorah Klein, Medford, MA (US); Tim Moulton, Newport, RI (US); Sam Palmer, Arlington, MA (US); Eric Saperstein, Maynard, MA (US)

(73) Assignee: Roche Molecular Systems, Inc., Pleasanton, CA (US)

( * ) Notice: Subject to any disclaimer, the term of this patent is extended or adjusted under 35 U.S.C. 154(b) by 507 days.

(21) Appl. No.: 16/758,835

(22) PCT Filed: Oct. 18, 2018

(86) PCT No.: PCT/EP2018/078643
§ 371 (c)(1),
(2) Date: Apr. 23, 2020

(87) PCT Pub. No.: WO2019/081351
PCT Pub. Date: May 2, 2019

(65) Prior Publication Data
US 2021/0181218 A1    Jun. 17, 2021

Related U.S. Application Data

(60) Provisional application No. 62/575,715, filed on Oct. 23, 2017.

(51) Int. Cl.
*G01N 35/00*         (2006.01)
*G01N 35/04*         (2006.01)

(52) U.S. Cl.
CPC ....... *G01N 35/00594* (2013.01); *G01N 35/04* (2013.01); *G01N 2035/00306* (2013.01);
(Continued)

(58) Field of Classification Search
CPC ............. G01N 35/00594; G01N 35/04; G01N 2035/00306; G01N 2035/00891;
(Continued)

(56) References Cited

U.S. PATENT DOCUMENTS 9,207,251 B2    12/2015   Bernet et al.
10,006,074 B2    6/2018   Robinson et al.
(Continued)

FOREIGN PATENT DOCUMENTS

CN    102353548 A    2/2012
CN    104024866      9/2014
(Continued)

OTHER PUBLICATIONS

International Search Report; PCT/EP2018/078643; dated Apr. 16, 2019.
(Continued)

*Primary Examiner* — Benjamin R Whatley
(74) *Attorney, Agent, or Firm* — Maneesh Gupta

(57) ABSTRACT

The present invention describes a laboratory system for automatically processing at least one sample container containing a biological sample, the laboratory system comprising a housing; laboratory instrument units for executing processing steps on the biological sample; an input station configured to receive the sample container; a transport means for transport of the sample container from the input station to the laboratory instrument units, and further to an output station; a control unit for determining whether the sample and/or the container is in a condition to be processed by the laboratory instrument units; an input-output station
(Continued)

providing an interface between the inside and the outside of the housing; and a workbench on the outside of the housing in front of the input-output station for an operator to be in the position to manipulate the sample and/or the container. Furthermore, the use of such a laboratory system as well as a method for processing a biological sample in a sample container by means of such a laboratory system is described.

16 Claims, 6 Drawing Sheets

(52) U.S. Cl.
CPC .............. *G01N 2035/00891* (2013.01); *G01N 2035/0406* (2013.01); *G01N 2035/0465* (2013.01); *G01N 2035/0484* (2013.01)

(58) Field of Classification Search
CPC ... G01N 2035/0406; G01N 2035/0465; G01N 2035/0484
See application file for complete search history.

(56) References Cited

U.S. PATENT DOCUMENTS

| | | | | |
|---|---|---|---|---|
| 2005/0089443 | A1* | 4/2005 | Blanton | G01N 35/00029 422/63 |
| 2010/0018330 | A1* | 1/2010 | Marty | G01N 35/04 73/864.81 |
| 2010/0126286 | A1* | 5/2010 | Self | G01N 35/026 73/863.81 |
| 2010/0291619 | A1* | 11/2010 | Robinson | G01N 35/0099 435/288.7 |
| 2013/0128035 | A1* | 5/2013 | Johns | B04B 15/00 348/135 |
| 2014/0295562 | A1* | 10/2014 | Wakamiya | G01N 35/04 422/67 |
| 2014/0305227 | A1* | 10/2014 | Johns | B04B 13/00 73/863.01 |
| 2015/0276566 | A1 | 10/2015 | Berntsen et al. | |
| 2017/0023561 | A1* | 1/2017 | Martinell Gispert-Sauch | G01N 35/04 |
| 2020/0311219 | A1* | 10/2020 | Varma | G06F 30/394 |

FOREIGN PATENT DOCUMENTS

| | | |
|---|---|---|
| CN | 106168629 A | 11/2016 |
| EP | 2148205 B1 | 1/2013 |
| JP | 2012225902 A | 11/2012 |
| JP | 2012526559 A | 11/2012 |
| WO | 2010/056903 A1 | 5/2010 |
| WO | 2010/132746 A2 | 11/2010 |

OTHER PUBLICATIONS

US2014/295562A1.
US2015/368606A1.

* cited by examiner

LABORATORY SYSTEM FOR AUTOMATICALLY PROCESSING BIOLOGICAL SAMPLES

CROSS-REFERENCES TO RELATED APPLICATIONS

This application is a national stage application, filed under 35 U.S.C. § 371, of International Patent Application No. PCT/EP2018/78643, filed Oct. 18, 2018, which claims the benefit and priority of U.S. Provisional Patent Application No. 62/575,715, filed Oct. 23, 2017, both of which applications are incorporated herein by reference.

TECHNICAL FIELD

The present invention relates to a laboratory system for automatically processing one or more sample containers containing biological sample or the like, and a method for processing biological sample provided in one or more sample containers by means of such a laboratory system. In further detail, the present invention is directed to a self-contained laboratory system comprising a housing, a sample container input station for receiving one or more sample containers each including a biological sample to be processed, one or more laboratory instrument units executing processing steps on the biological sample, transport means for transporting the sample container from the sample container input station to the one or more laboratory instrument units, and further to a sample container output station, as well as a method for processing the biological sample by means of such a laboratory system.

BACKGROUND

Usually, the processing of biological samples involves a complex structure of operational steps, resulting in an increased number of procedural and security aspects to be considered ahead of the execution of each processing step. In order to improve the manageability of such processing, advancements in computer technology, network connectability and also robotic technology have found their way into laboratory settings in order to achieve a certain degree of automation, which has become a useful tool in streamlining different kinds of laboratory-related work processes. In particular, its use has been employed to streamline the process of preparing environment samples or patient samples such as tissue, blood, saliva or urine, which samples are routinely taken from patients by medical personnel in hospitals or in private practice, for laboratory analysis, e.g. for determining concentration levels of different components of the taken samples. Such determined values can be important aids in the diagnosis of diseases and are, thus, important indicators of the state of health of a patient.

In laboratory settings, any degree of automation of previously manually carried-out processes can significantly reduce personnel costs and increase sample throughput volume and, in turn, can reduce the time it takes to analyze the sample and report the results to the recipient, which can significantly improve the start of treatment of a patient, and can even save a patient's life. Currently, many of those processing steps are executed manually by laboratory personnel, resulting in prolonged sample processing workflows and, thus, a delay in result report, and also an increased risk of erroneous analysis results due to potential human error. For example, in usual cases, a blood sample must be divided into smaller sample portions and provided into containers, which have to be labeled with date and time of sampling and sample preparation and also with an identifier enabling the association of each sample portion with the corresponding patient, for example in the form of a printed bar code label or a hand written information. Afterwards, the sample containers are usually transferred manually to storage, awaiting the further processing. In such case, i.e. when a sample analysis is to be executed on an already stored sample, the lab personnel usually has to manually identify the appropriate sample in the storage, manually pre-process the sample in order to make it ready for the upcoming analysis, and transfer it manually to the analyzing equipment, which presents a lot of possibilities of human error.

With the above described advances in laboratory technology, the manual workflows as described before can be automated by means of automated laboratory systems, resulting in that any kind of human error in this regard can be reduced or, even completely avoided. As an example of the already known prior art regarding such automated laboratory systems, US 2015/0276566 A1 describes an automated platform for inoculating a variety of receptacles with biological samples for testing and analysis, which platform includes a plurality of modules used to automate the inoculation of media for subsequent analysis. Therefore, the lab automation system comprises a module to enter specimen/order information and store an inventory of petri dishes, a further module for labelling the sample receptacles with a unique identifier associating the receptacles with the sample, and another module including a robot for retrieving sample and inoculating the receptacles. A further example of the mentioned advances in laboratory technology can be gathered from WO 2010/056903 A1, in which an automated sample processing system is described, having a sample input for simultaneously receiving a number of sample containers, a reagent input for receiving reagent supplies, a consumable input for receiving consumable supplies, a processing center for processing the sample containers, a solid waste output for receiving used consumable supplies, and a liquid waste output for receiving one or more used reagent supplies. Here, the processing center includes, for example, a decapper for removing a lid from each sample container, an aspirator for removing a specimen from each sample container and for transferring the specimen to an output vessel, and a capper for replacing the lid on each sample container. Moreover, a further example of such prior art is known from EP 2 148 205 B1, in which a method and laboratory system for handling sample tubes and an image analyzing unit is described, wherein sample tubes contained in an incoming primary rack are analyzed by means of image analyzing. Here, based upon data from the image analysis, the geometry parameters of the sample tubes are determined, and it is further determined whether an analyzed tube fulfils predetermined geometry criteria, or not. In case of non-fulfilment of the predetermined geometry criteria, the sample tube is sorted into a so-called secondary rack, waiting for manual extraction from the laboratory system by laboratory personnel.

Accordingly, a lot of samples are not in a perfect condition when they arrive at the laboratory system due to, for example, the occurrence of clots in the samples provided inside the sample containers, unreadable barcode on a sample container, or too much or too little sample liquid in the sample container. Therefore the laboratory instrument units of an automated laboratory system can come across a multitude of problems with the samples contained in the loaded sample containers or with the loaded sample containers themselves, which problems can not be solved, for example, by means of an inbuilt error recovery handling unit inside the laboratory system, i.e. by the laboratory system on its own. In case of such an "unsolvable" problem, the laboratory personnel usually has to interrupt the automated workflow, breach the usually closed environment of the laboratory system, manually extract the erroneous sample container from the laboratory system, manually transport the erroneous sample container to a remote laboratory working space for manually correcting the error of the erroneous sample container, if possible, then manually transport the erroneous sample container back to the laboratory system and place the corrected sample container back into the laboratory system for further processing. Currently, such error correction procedures are undesirable due to the breach of the closed laboratory system (potential contamination), quite time consuming and not user-friendly, since the laboratory personnel firstly has to print out a report to get detailed information on the problem and then transport the erroneous sample container to and from a remote laboratory working space, where it is manipulated into a corrected state, if even possible.

Thus, there is a constant need in the art of automated laboratory technology for a laboratory system that is adapted for solving issues with such not automatically correctable erroneous samples or sample containers in a simple, fast and efficient manner.

SUMMARY

The present invention addresses the above problems with regard to the provision of a laboratory system, such as an analytical, pre-analytical or post-analytical processing system, for automatically processing biological sample. In general, before a chemical, biological, physical, optical or other technical analysis can be performed on a sample by an analytical processing system, a variety of different pre-analytical processing steps may have to be executed on a sample of a patient by instruments of a pre-analytical processing system, such as sample centrifugation instrument for centrifuging a sample, sample resuspension instrument for resuspension of a sample, sample container capping or decapping instruments for capping and/or decapping a sample container, a recapping instrument for recapping a sample container after decapping the same, and/or aliquotation instrument for dividing a sample into aliquots of the sample, and the like. After the analysis, a variety of different pre-analytical processing steps may have to be executed on the sample by instruments of a post-analytical processing system, for example for executing one or more post-analytical processing steps on one or more biological samples, such as the verification and review of the analytical results, as well as the communication of these results to the operator of the laboratory system and their interpretation.

Specifically, according to one aspect of the present invention, a laboratory system for automatically processing at least one sample container, such as a sample tube, a sample vial or the like, containing a biological sample is described, which laboratory system is self-contained, in the sense of a secluded or sealable design. The laboratory system comprises, inter alia, a housing; one or more laboratory instrument units provided within the housing and configured to execute processing steps on the biological sample, wherein the one or more laboratory instrument units can be configured to execute analytical, pre-analytical or post-analytical processing steps on the biological sample; a sample container input station configured to receive the sample container, wherein the sample container input station can be configured to receive different sample container types; a transport means configured to transport the sample container from the sample container input station to the laboratory instrument units, and further to a sample container output station; and a control unit configured to determine whether the biological sample and/or the sample container is in a condition to be processed by the one or more laboratory instrument units. Furthermore, the laboratory system comprises a sample container input-output station arranged between the sample container input station and the sample container output station and connected with the transport means, wherein the sample container input-output station, which can contain up to 20 sample containers in its loop, provides an interface between the inside and the outside of the housing. As a transfer means for transferring the sample containers from, for example, the sample container input station to the transport means, from the transport means to and from the a sample container input-output station, and/or from the transport means to the sample container output station, a tube handling component can be provided as part of the laboratory system, for example in the form of a robotic arm or the like.

Moreover, the laboratory system of the present invention comprises a workbench provided on the outside of the housing and in front of the sample container input-output station, wherein the workbench is provided for an operator, usually laboratory personnel such as a laboratory employee or laboratory assistant, to be in the position to manipulate the sample and/or the sample container determined by the control unit as not in the condition to be processed by the one or more laboratory instrument units. Here, as an example, the workbench can be implemented as simple cantilevered table in front of the housing of the laboratory system, and more particularly in front of the sample container input-output station. Further, the workbench can provide different useful features, such as one or more indentations in the upper surface of the workbench, e.g. for securely accommodating working tools or working supply, or recesses sized to receive the sample container to be manipulated can be provided in the workbench, for the operator's convenience.

In the context of biomedical research, analytical processing is a technical procedure to characterize the parameters of a biological sample or of an analyte. Such characterization of parameter comprises, for example, the determination of the concentration of particular proteins, metabolites, ions or molecules of various sizes in biological samples derived from humans or laboratory animals, or the like. The gathered information can be used to evaluate e.g. the impact of the administration of drugs on the organism or on particular tissues. Further analyses may determine optical, electrochemical or other parameters of the samples or the analytes comprised in a sample.

Further, in the context of the present invention, a sample container input station is to be understood as a station provided as an interface in the housing of a laboratory system, through which a sample container can be loaded into the self-contained laboratory system. Such an interface can be provided in the form of a gate mechanism, such as a flap door, a double door system or the like.

Moreover, in the context of the present invention, a sample container output station is to be understood as a station provided as an interface in the housing of a laboratory system, through which a sample container can be discharged from the self-contained laboratory system after processing. Such an interface can again be provided in the form of a gate mechanism, such as a flap door, a double door system or the like. Also, the sample container input station and the sample container output station can be implemented by the same sample container station, for example in the form of one or several interface slots into which the sample containers to be processed can be loaded, for example gathered in a respective sample container tray, and from which the processed sample containers can be unloaded after processing.

Furthermore, in the context of the present invention, a sample container input-output station is to be understood as a station arranged as a kind of branch-off provided intermediate in the processing workflow of the laboratory system, positioned between the sample container input station and the sample container output station and connected with the transport means. Here, the sample container input-output station is provided as an interface in the housing of the laboratory system, through which one or several particularly selected sample containers can be discharged from the self-contained laboratory system to the outside e.g. for manual work of a lab employee to deal with erroneous samples or sample containers ("unhappy samples"), i.e. from an error handling area within the laboratory system into the vicinity of the workbench and then handed out to the operator at the combined input-output station. Such discharge can be implemented in the form of a sample container transport line connected to the transport means passing through the interface in the housing and in which the manually processed sample container can be returned, reintroduced into the laboratory system and reintegrated into the processing workflow. A means exhibiting the interface function of the sample container input-output station can be provided in the form of a gate mechanism, such as a double door system, a window mechanism or the like, through which the particularly selected sample container, usually an erroneous sample container, can be transported and presented to the outside, wherein such transport can be implemented, for example, in the manner of a sushi conveyor or the like, which is accessible through on outer gate or window. A sample container input-output station in the sense of the present invention can also be referred to as single error sample container input-output line ending in an input-output slot, i.e. the interface, or, more simple, as single error line "SEL" allowing a direct sample container in- and output to present one sample container at a time to the operator to allow a clear match between respectively provided information, for example on a screen or the like, and the physically presented sample container. After the error of the sample or the sample container is manually resolved by the operator, the sample container can be placed back into the slot of the SEL, which then returns the sample container back inside into the housing of the laboratory system, where it is handed over to a sample container handler or the like.

In the laboratory system of the present invention, a sample and/or a sample container will be determined as being not in the condition to be processed, i.e. not in the condition to be completed successfully, if an error occurred during the sample processing workflow and if the laboratory system was not able to continue the workflow run until its completion, which resulted in an undesired workflow run interruption. In such case, manual manipulation of the sample and/or the sample container determined as not processable is necessary in order to correct the error, if possible. Such manual manipulation is to be understood as the operator being needed for manually processing such a sample container, i.e. a sample container related error ("sample container error") such as an incorrect labelling of the sample container, an unreadable barcode on the sample container, or the like, or for manually processing the content of such a sample container, i.e. a sample related error ("sample error") such as the occurrence of clots in the samples, too much or too little sample liquid in the sample container, or the like. For the sake of easier reference, "sample container errors" or "sample errors" can both be named as "sample container determined to be not in a condition to be processed by the one or more laboratory instrument units" or "error sample container", due to the fact that—in both cases—the entire sample container is in need of manual processing since the sample is inherently provided in the sample container and any manual processing of the sample results in a certain degree of manual processing the sample container itself, even if it is only by removing and reattaching its lid or cap after processing the sample.

Now, the provision of the workbench close to the sample container input-output station makes it simple and fast for the operator to carry out the required manual processing, since the operator can use the workbench as workspace for manually processing the error sample container in order to remedy the error. Alternatively, the operator can also dispose of the error sample container, which makes a physical separation of "error type" samples or "error type" sample containers possible without fully shutting down the workflow in the laboratory system due to the sample container input-output station providing the interface between the inside and the outside of the housing, thereby forming a buffer for erroneous samples and/or erroneous sample containers. Accordingly, a sorting or intelligent steering/resolution of such a workflow error can be achieved by the operator. Additionally, in case the workflow requires additional "manual" processing steps or interventions, the operator is no longer required to breach the closure of the laboratory system for extraction of the respective sample container, since the above described input-output function of the laboratory system and the provision of the workbench close to the sample container input-output station makes it possible to include such additional manual processing steps, if desired, into the workflow of the laboratory system without substantial interruption of the workflow. Also, such additional manual processing steps, if necessary, can be carried out in a fast and efficient manner, since the operator can avoid the transport of the samples to and from a separate and potentially remote working space for manually processing the samples due to the workbench positioned in the immediate vicinity of the laboratory system.

According to a specific embodiment of the laboratory system, the workbench can be integrated into the housing of the laboratory system, i.e. the workbench is an integral part of the housing of the laboratory system as a component fixed to the outside of the housing, wherein the workbench can be mounted to the housing of the laboratory system, i.e. the outside surface of the housing, thereby allowing for immediate manual work of a lab employee to deal with erroneous sample containers right at the spot.

Furthermore, the workbench can be a pivotable workbench, meaning that the workbench can be moved in a pivoting manner about a fixed-point, when desired, while items arranged on the workbench can remain on the workbench during and after pivoting. Here, as a specific embodiment, the workbench can be pivoted away from the housing of the laboratory system, preferably on a horizontal plane, wherein one end of the workbench, or at least of a pivotable part of the workbench, remains fixed, as pivot point. In such case, the workbench can be mounted to the housing by means of a hinge mechanism provided at the housing and being connected to one end of the workbench, such that the workbench can be arranged in abutment to the housing or spaced apart from the housing, wherein any pivotal position or pivotal orientation of the workbench can be locked or fixed, in order to be able to secure the workbench in any desired pivot angle. Furthermore, the workbench can also be adapted to pivot to the outside of the housing together with a pivotable housing component. In such case, the workbench does not require a separate hinge mechanism but can be attached to the pivotable housing component as an integral part thereof, wherein the pivotable housing component is connected to or comprises the necessary hinge mechanism. Accordingly, the workbench turns sideways along with the pivotable housing component when pivoting the same to the outside. Here, by pivoting the respective housing component to the outside, a part of the housing is usually opened up, which can be beneficial in case the operator is required to enter the laboratory system for maintenance, troubleshooting, or the like, wherein the workspace on top of the workbench is unaffected. Here, the pivotable housing component can be implemented in the form of a housing door or housing window, which extends only about a part of a housing side, such as in case of a housing window, but can also extend over the entire height or length of the housing, such as in case of a housing door. Alternatively, the housing component can be implemented in the form of a pivotable multi-part housing component, such as a double-winged door or double-winged window or the like, in which case the workbench can be implemented as a separable multi-part workbench, wherein each separable part of the multi-part housing component is then pivotable to the outside of the housing together with a pivotable separable part of the multi-part workbench, wherein the workspace on each separable part on top of the workbench is unaffected by the pivoting movement, i.e. any items positioned on top of the workbench can remain on the workbench without the need of removing the same before pivoting.

According to an optional embodiment of the laboratory system, the workbench can be a foldable workbench adapted to fold downward towards the housing, meaning that the workbench can be hinged in order to be able to flap down and go into abutment with the surface of the housing or the like, if desired. Therefore, the workbench can be mounted to the housing by means of a hinge mechanism provided at the housing and being connected to a side of the workbench, such that the hinged side of the workbench can be arranged in abutment with the housing's surface when swung upwards in a fold-out position in order for the operator to be able to carry out processing steps on its upper surface providing a workspace, wherein any folding position of the workbench can be locked or fixed in any arbitrary folding angle, such as between 0° and 90° from a vertical axis. Accordingly, the workbench can be hinged/swung/folded about one axis, wherein the workbench can comprise a folding mechanism with a latching mechanism, or the like.

According to an optional embodiment of the laboratory system, the workbench can also be height-adjustable, in order to achieve a reasonable working height for the operator, depending on the height of the operator and his specific working position, for example standing up or sitting down. The mechanism for adjusting the height of the workbench can be provided in the form of a glide-and-lock mechanism, a pneumatic spring mechanism or the like, and can be integrated into the housing, or can alternatively be provided by a separate component which can also have the previously described pivoting or folding mechanism of the workbench integrated in its mechanism in some form.

According to a further specific embodiment of the laboratory system, the laboratory system further comprises a display or screen for providing the operator with detailed information about the condition of each biological sample being in process to be processed by the one or more laboratory instrument units, wherein the screen can be provided above the workbench as integral part of the housing or, alternatively, as a separate component mounted on the housing. Here, it is beneficial if the screen can be movable in a way such that the operator can change the angular orientation and/or the spatial position of the screen as desired, in order for him to be able to clearly see the screen. This is particularly helpful for the operator when retrieving a sample container from the sample container input-output station, in order for providing the operator with particular information about the condition of the sample container, which also includes particular information if the container is determined to be not in a condition to be processed by the one or more laboratory instrument units, i.e. a "sample container error", if any, and also information about the condition of the biological sample provided inside of the sample container, which also includes particular information if the sample is determined to be not in a condition to be processed by the one or more laboratory instrument units, i.e. a "sample error", if any. The screen can be mounted on the housing in front of the operator positioned at the workbench, i.e. integrally with the housing or as a separate component connected to the housing, wherein the screen can be swivel-mounted on the housing by means of an articulated arm connected to the housing. Thereby, the movability of the screen in different directions and heights in front of the housing of the laboratory system can be ensured, and the operator will be in the position to move the screen, such as a monitor, a tablet or the like, with him/her when changing his/her position relative to the laboratory system. Further, the screen can be a man-machine interface, such as a touchscreen or the like, or a simple screen combined with, for example, a virtual assistant comprising a natural language user interface or the like, in order for the operator to achieve data exchange with the screen in a simple, preferably hands-free, and time efficient manner.

According to a further specific embodiment of the laboratory system, the laboratory system comprises at least one drawer provided in the proximity of the workbench, wherein the drawer, or a multitude of drawers, can be provided on the outside of the housing underneath or adjacent to the workbench, i.e. in the reaching area of the operator, wherein the drawer can be adapted to provide manipulation devices to be used by the operator for manipulating the biological sample and/or the sample container. Here, the drawer, or the multitude of drawers, can be inserted into the housing in an extractable manner, wherein the drawers can be lockable in an extracted position, if desired, in order for the operator to gain easy and secure access to the content of the drawer. Alternatively, or additionally, the at least one drawer can comprise caps for the sample containers, or a waste bin for any kind of disposable parts used during the manual processing of the biological sample and/or the sample container, or also for disposing of any erroneous sample or sample container which is no longer able to be further processed.

According to a further specific embodiment of the laboratory system, the sample container input-output station comprises a transition area, also described as transition zone, for providing at least one sample container from the inside of the laboratory system to an input-output slot, wherein the input-output slot can comprise a flap or door mechanism, which mechanism can be an automated flap or door mechanism, i.e. a flap or door mechanism which is controlled, for example, by the control unit of the laboratory system, providing the operator access to the at least one sample container arranged in the input-output slot. Here, the at least one sample container can also include more than one sample container, such as 3 or 5 sample containers determined to be not in a condition to be processed by the one or more laboratory instrument units. Here, in such case, the transition area constitutes a comprehensive sample container presenting area, wherein the operator can be provided with access to several sample containers of the transition area at the same time by means of the input-output slot, and is, thus, in the position to receive a plurality of erroneous sample containers from the SEL in parallel, which can have a positive effect on the throughput rate. However, according to a further specific embodiment of the transition area of the sample container input-output station, the input-output slot provides restricted access to only one single sample container at a time. Thereby, it can be ensured that the operator does not manually process the wrong sample container, which can have fatal consequences, such as false analysis results or the like. Accordingly, the provision of only one single sample container within the transition area for the operator to grasp can be understood as a security measure for avoiding the generation of errors when manually processing a sample container determined to be not in a condition to be processed by the one or more laboratory instrument units. According to a specific embodiment of the input-output slot of the present invention, the input-output slot can comprise a confirmation means for providing the operator with a possibility for providing a feedback to the control unit regarding the sample container determined by the control unit as not in the condition to be processed by the one or more laboratory instrument units, such as a feedback indicating the accessibility of respective sample container by the operator, and/or the completion of the manual processing of the sample container and its return into the input-output, wherein the optional confirmation means can be a confirmation button provided on the sample container input-output station, a software button on the screen, a foot pedal blow the workbench, an identification device activatable by an ID card or the like, or wherein the confirmation means is provided by a camera recognizing a gesture of the operator, or the like. Moreover, the input-output slot can comprise a sensor means for determining the presence of at least one sample container in the input-output slot, such as a light barrier sensor, a camera, a physical switch sensor, or a contact sensor, in order to avoid any problem in the workflow of processing the sample container determined by the control unit as not in the condition to be processed by the one or more laboratory instrument units.

According to a further specific embodiment of the laboratory system, the control unit comprises an application software for receiving sample information, i.e. information about a sample inside a sample container, from an identification means, such as a barcode reader, a camera, or the like, by reading a sample container identifier provided on the respective sample container associated with the contained biological sample by the identification means and transmitting information to the application software. Such sample container identifiers can be implemented in the form of a label, such as a barcode label or a handwritten label, provided on the respective sample container, wherein the information about the contained sample can be provided to the operator in case the respective sample container is determined by the control unit as not in the condition to be processed by the one or more laboratory instrument units.

According to a further specific embodiment of the laboratory system, the transport means of the laboratory system, or any transport means inside the laboratory system, can be a conveyor means adapted to transport several sample containers in a row or in a bulk from the sample container input station to the one or more laboratory instrument units, in a row to the sample container input-output station and/or in a row or a bulk to the sample container output station, wherein the conveyor means can be a chain mechanism or the like, comprising retainers for holding the sample containers. Alternatively, any transport means inside the laboratory system can also be implemented in the form of a tube handler mechanism, such as a tube gripper, a rack handler or a shuttle tray, or the like.

According to a further aspect of the present invention, a particular use of a laboratory system as described above is disclosed, wherein the described laboratory system is used for automatically processing at least one biological sample contained in at least one sample container. Here the biological sample inside the sample container is generally processed automatically in the laboratory system, wherein the sample container is manually manipulated by the operator on the workbench in case the biological sample and/or the sample container is not in a condition to be processed by the one or more laboratory instrument units. Thus, the described laboratory system makes it possible to manually correct any problems or errors occurring with the sample containers or the samples inside the laboratory system during the workflow, or problems or errors that were caused already before providing the respective sample container into the laboratory system, wherein the possibility of extracting certain sample containers from the automatic workflow inside the laboratory system and correcting the identified problems or errors on a workbench provided directly at the laboratory system results in a simple, fast and, thus, effective way of processing sample containers by means of such a laboratory system.

According to an even further aspect of the present invention, a method for processing at least one biological sample provided in a sample container by means of a laboratory system as described above is disclosed, wherein the method comprises at least the steps of providing at least one sample container with a biological sample into the sample container input station, from which the sample container can be transferred to a transport means for transporting the sample container to the one or more laboratory instrument units of the laboratory system, for processing the sample contained inside the sample container; determining whether the biological sample and/or the sample container are is in a condition to be processed by the one or more laboratory instrument units, by means of the control unit of the laboratory system; provided that the biological sample and/or the sample container is determined to be in a condition to be processed by the one or more laboratory instrument units, providing the sample container to the one or more laboratory instrument units for executing processing steps on the biological sample; and, alternatively, if the biological sample and/or the sample container is determined to be not in a condition to be processed by the one or more laboratory instrument units, providing the sample container to the sample container input-output station for manipulation of the biological sample and/or the sample container by the operator on the workbench. Here, the operational steps and means as described above in regard to the structure of the laboratory system itself also apply for the method of the present aspect of the invention.

According to a specific embodiment of the presently described method, provided that the biological sample and/or the sample container is determined to be in a condition to be processed by the one or more laboratory instrument units, the sample container is provided to the sample container output station after executing processing steps on the biological sample by the one or more laboratory instrument units. However, provided that the biological sample and/or the sample container is not in a condition to be processed by the one or more laboratory instrument units, the sample container is provided to the sample container input-output station for manipulation of the biological sample and/or the sample container by the operator on the workbench and, in case that the manipulation by the operator results in the sample and/or the sample container passing over into a condition ready for being processed by the one or more laboratory instrument units, the sample container is provided to the one or more laboratory instrument units for executing processing steps on the biological sample, followed by providing the processed sample container to the sample container output station. Here, in more detail, after the manipulation by the operator resulting in the sample and/or the sample container being turned into a condition ready for being processed by the one or more laboratory instrument units, the manually processed sample container can be returned into the sample container input-output station, reintroduced into the laboratory system and reintegrated into the processing workflow in order for the sample container being released to the one or more laboratory instrument units for executing processing steps on the biological sample, as usually intended before identifying the error. Thereby, a simple, fast and effective method for processing at least one biological sample provided in a sample container by means of such a laboratory system, with particular regard to the sample container input-output station, the workbench as well as the screen can be provided.

The present invention is not limited to the particular methodology described herein because they may vary. Although any devices, methods and materials similar or equivalent to those described herein can be used in the practice of the present invention, the specific devices, specific methods and specific materials are described herein. Further, the terminology used herein is for the purpose of describing specific embodiments only and is not intended to limit the scope of the present invention.

The term "laboratory system" as used herein encompasses any system for the use in a laboratory comprising one or more laboratory instrument(s) operatively connected to a control unit.

The term "laboratory instrument" or "instrument" of the laboratory as used herein encompasses any apparatus or apparatus component operable to execute one or more processing steps/workflow steps on one or more biological samples. The expression "processing steps" thereby refers to physically executed processing steps such as centrifugation, aliquotation, sample analysis and the like. The term "laboratory instrument" or "instrument" of the laboratory covers pre-analytical instruments, post-analytical instruments and also analytical instruments.

The term "pre-analytical" as used herein relates to the execution of one or more pre-analytical processing steps on one or more biological samples, thereby preparing the samples for one or more succeeding analytical tests. A pre-analytical processing step can be, for example, a centrifugation step, a capping-, decapping- or recapping step, an aliquotation step, a step of adding buffers to a sample and the like. The term "analytical" as used herein encompasses any process step carried out by one or more laboratory devices or operative units which are operable to execute an analytical test on one or more biological samples. The term "post-analytical" as used herein relates to the execution of one or more post-analytical processing steps on one or more biological samples, which steps begin with the verification and review of the analytical results, as well as to the communication of these results to the operator of the laboratory system and their interpretation.

The term "control unit" as used herein encompasses any physical or virtual processing device configurable to control a laboratory system comprising one or more laboratory instruments in a way that workflow(s) and workflow step(s) are conducted by the laboratory system. The control unit may, for example, instruct the laboratory system (or a specific instrument thereof) to conduct pre-analytical, post analytical and analytical workflow(s)/workflow step(s). The control unit may receive information from a data management unit regarding which steps need to be performed with a certain sample. Further, the control unit might be integral with a data management unit, may be comprised by a server computer and/or be part of one instrument or even distributed across multiple instruments of the laboratory system. The control unit may, for instance, be embodied as a programmable logic controller running a computer-readable program provided with instructions to perform operations.

The term "user interface" as used herein encompasses any suitable piece of software and/or hardware for interactions between an operator and a machine, including but not limited to a graphical user interface for receiving as input a command from an operator and also to provide feedback and convey information thereto. Also, a system/device may expose several user interfaces to serve different kinds of users/operators.

The term "workflow" as used herein encompasses any task that comprises a number of steps, such as for maintenance or operation of the system or one of its system components.

The term "workflow step" as used herein encompasses any activity belonging to a workflow. The activity can be of an elementary or complex nature and is typically performed at or by one or more instrument(s).

The terms "sample" and "biological sample" refer to material(s) that may potentially contain an analyte of interest. The sample can be derived from any biological source, such as a physiological fluid, including blood, saliva, ocular lens fluid, cerebrospinal fluid, sweat, urine, stool, semen, milk, ascites fluid, mucous, synovial fluid, peritoneal fluid, amniotic fluid, tissue, cultured cells, or the like. The patient sample can be pretreated prior to use, such as preparing plasma from blood, diluting viscous fluids, lysis or the like. Methods of treatment can involve filtration, distillation, concentration, inactivation of interfering components, and the addition of reagents. A sample may be used directly as obtained from the source or used following a pretreatment to modify the character of the sample. In some embodiments, an initially solid or semi-solid biological material can be rendered liquid by dissolving or suspending it with a suitable liquid medium. In some embodiments, the sample can be suspected to contain a certain antigen or nucleic acid.

The term "sample tube" or "sample container" refers to any individual container for transporting, storing and/or processing a sample. In particular, said term without limitation refers to a piece of laboratory glass- or plastic-ware optionally comprising a cap on its upper end. Sample tubes, e.g. sample tubes used to collect blood, often comprise additional substances such as clot activators or anticoagulant substances which have an impact on the processing of the sample. As a consequence, different tube types typically are adapted for pre-analytical, analytical and/or post-analytical requirements of a particular analysis, e.g. a clinical chemistry analysis, a hematological analysis or a coagulation analysis. A mix-up of sample tube types can make (blood) samples unusable for analysis. To prevent errors in the collection and handling of samples, the sample caps of many tube manufacturers can be encoded according to a fixed and uniform color scheme. Some sample tubes types in addition or alternatively are characterized by particular tube dimensions, cap dimensions, and/or tube color. A dimension of a tube comprises e.g. its height, its size and/or further characteristic shape properties.

As used herein and in the appended claims, the singular forms "a", "an", and "the" include plural reference unless the context clearly dictates otherwise. Similarly, the words "comprise", "contain" and "encompass" are to be interpreted inclusively rather than exclusively; that is to say, in the sense of "including, but not limited to". Similarly, the word "or" is intended to include "and" unless the context clearly indicates otherwise. The terms "plurality", "multiple" or "multitude" refer to two or more, i.e. 2 or >2, with integer multiples, wherein the terms "single" or "sole" refer to one, i.e. =1. Furthermore, the term "at least one" is to be understood as one or more, i.e. 1 or >1, also with integer multiples. Accordingly, words using the singular or plural number also include the plural and singular number, respectively. Additionally, the words "herein," "above," and "below" and words of similar import, when used in this application, shall refer to this application as a whole and not to any particular portions of the application.

The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The following examples are intended to illustrate various specific embodiments of the present invention. As such, the specific modifications as discussed hereinafter are not to be construed as limitations on the scope of the present invention. It will be apparent to the person skilled in the art that various equivalents, changes, and modifications may be made without departing from the scope of the present invention, and it is thus to be understood that such equivalent embodiments are to be included herein. Further aspects and advantages of the present invention will become apparent from the following description of particular embodiments illustrated in the figures.

Figure 1:
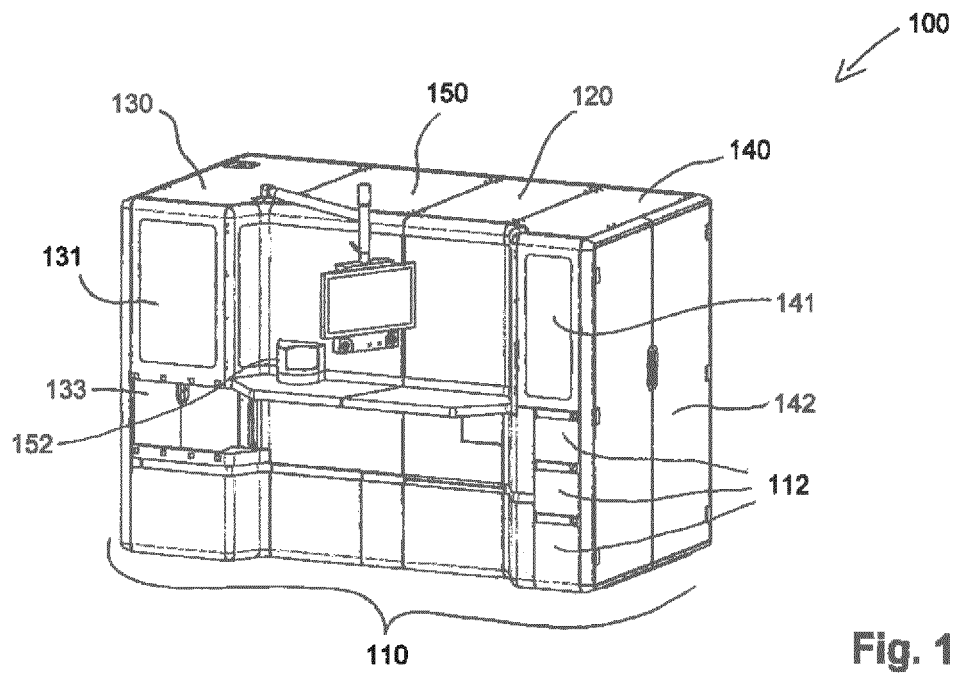
FIG. 1 is a schematic perspective illustration of a laboratory system for automatically processing biological sample according to an embodiment of the present invention in a closed state, viewed from the upper right side.
Figure 2:
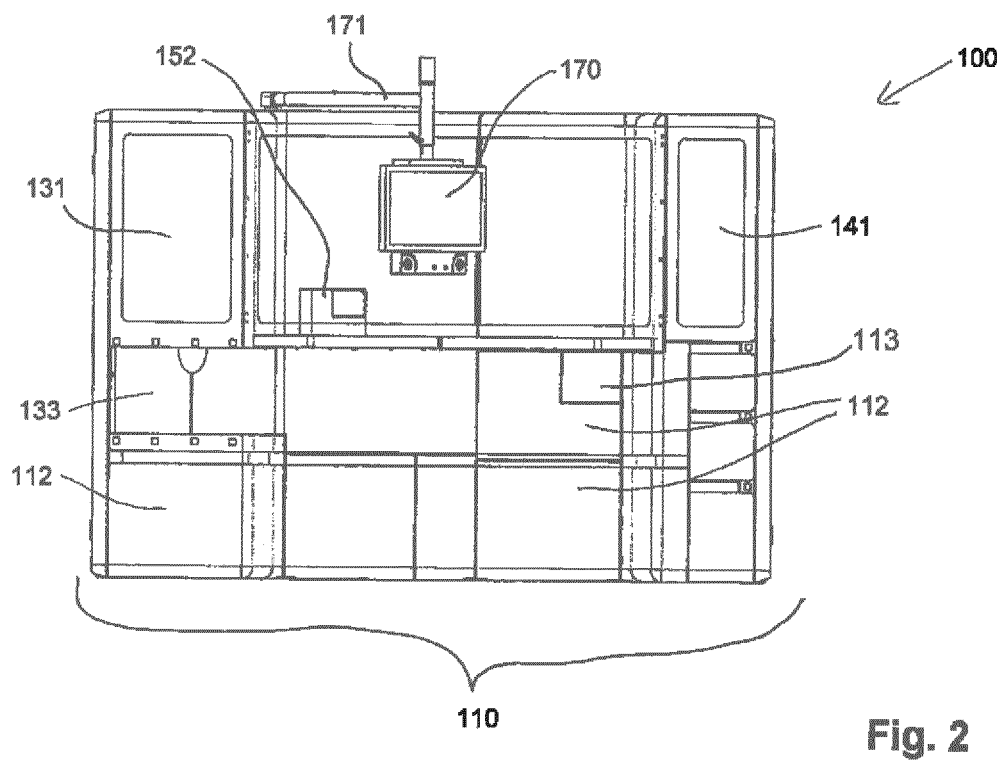
FIG. 2 is a schematic frontal illustration of the laboratory system as shown in FIG. 1 in a closed state.
Figure 3:
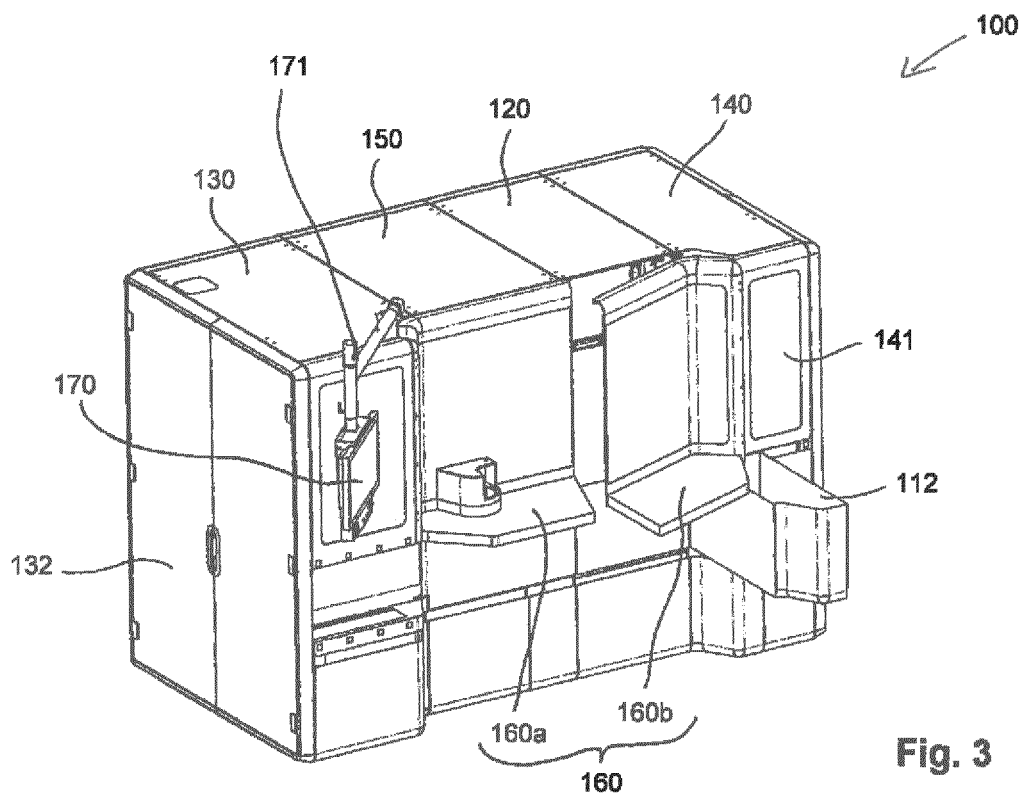
FIG. 3 is a schematic perspective illustration of the laboratory system as shown in FIGS. 1 and 2 in a state with one window side in a slightly opened position, viewed from the upper left side.
Figure 4:
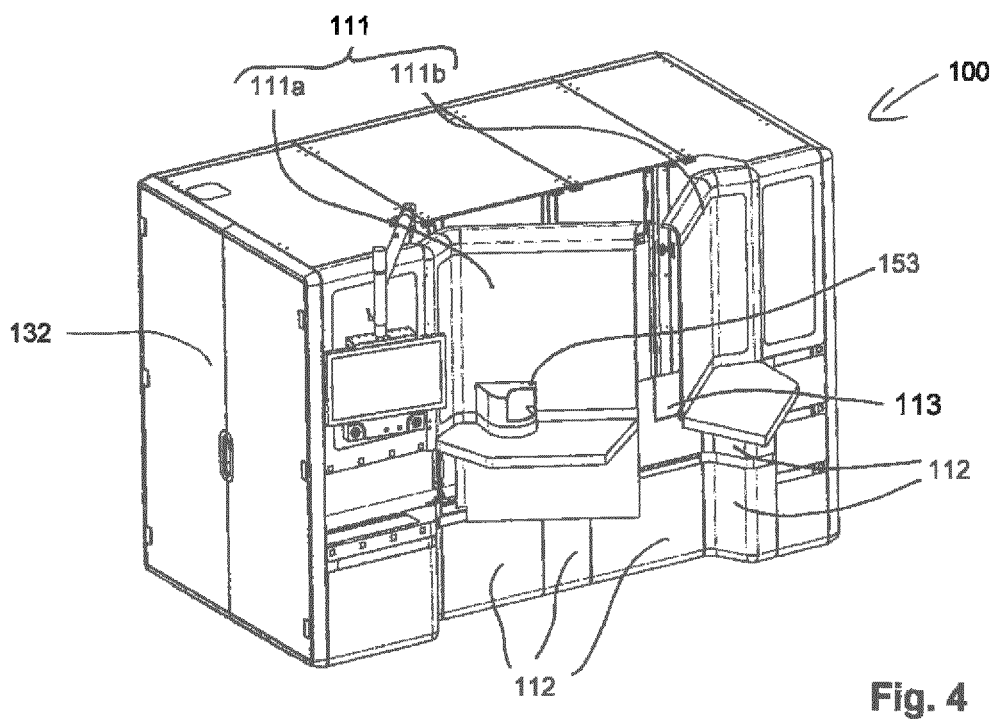
FIG. 4 is a schematic perspective illustration of the laboratory system as shown in FIGS. 1 to 3 in a state with both window sides in a substantially one-third opened position, viewed from the upper left side.
Figure 5:
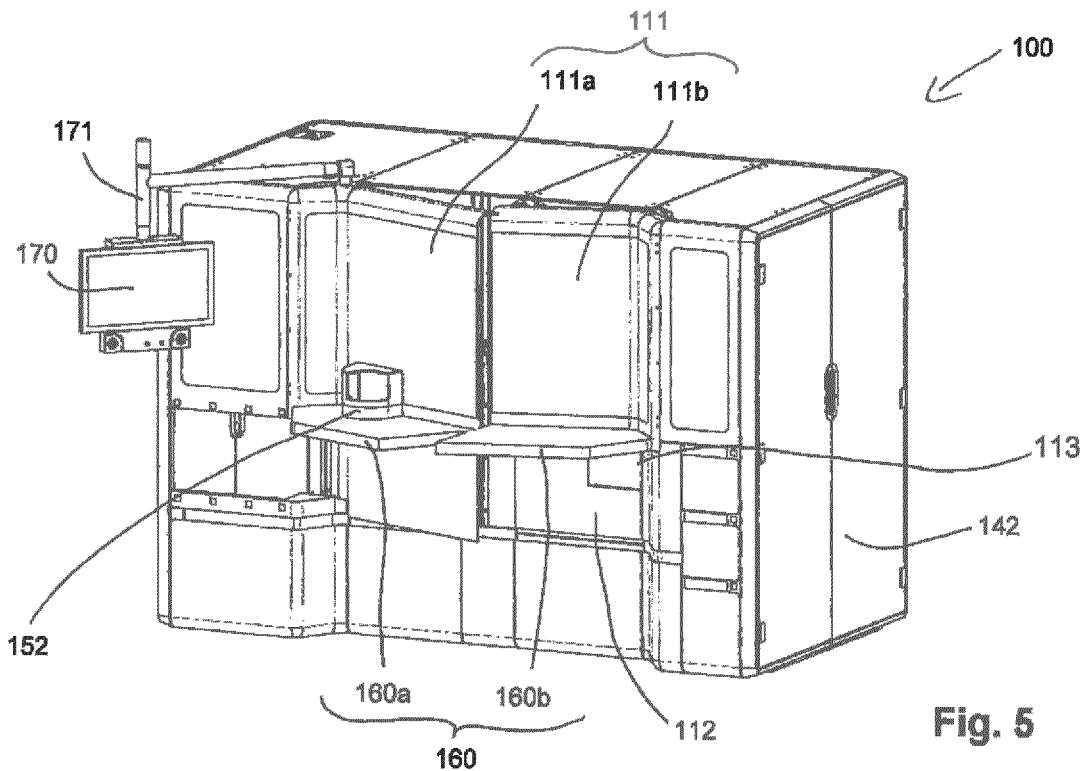
FIG. 5 is a schematic perspective illustration of the laboratory system as shown in FIGS. 1 to 4 in a state with both window sides in a slightly opened position, viewed from the upper right side.
Figure 6:
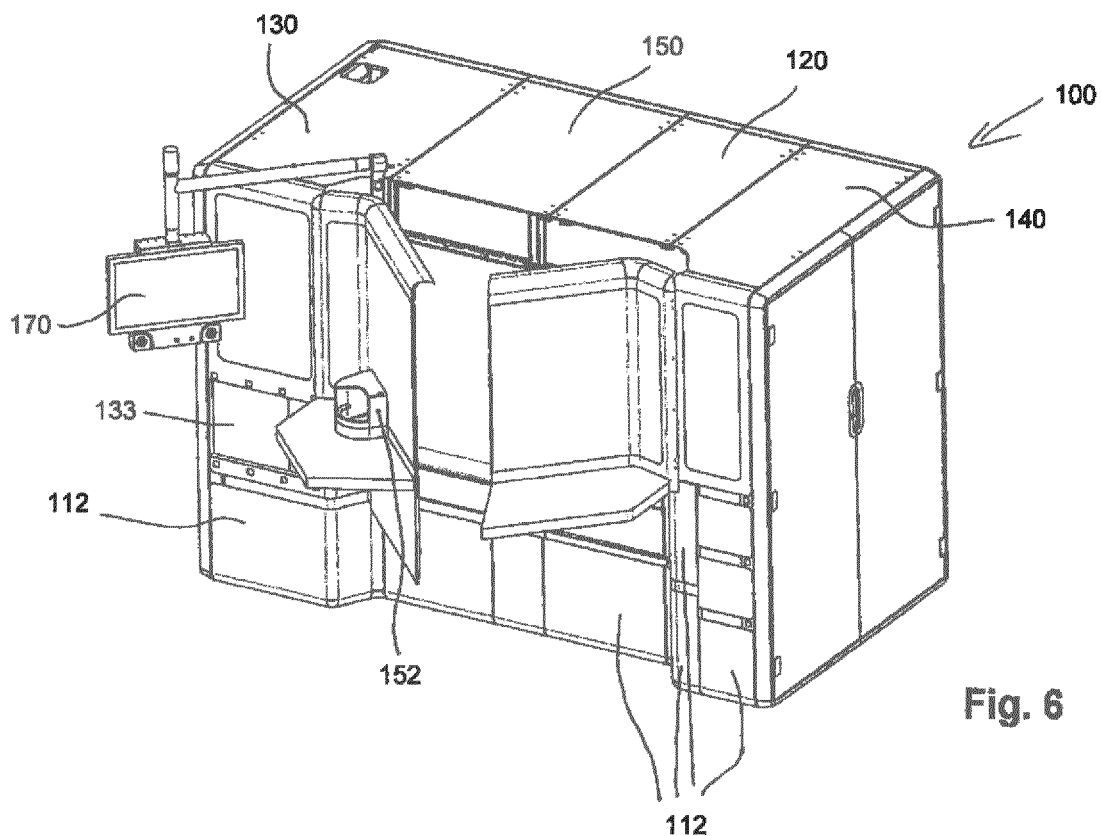
FIG. 6 is a schematic perspective illustration of the laboratory system as shown in FIGS. 1 to 5 in a state with both window sides in a halfway opened position, viewed from the upper right side.

LIST OF REFERENCE NUMERALS 100 laboratory system
101 control unit
102 CPU ("Central Processing Unit")
103 transport means
104 transport means
105 transport means
110 housing
111 openable multi-part housing component
111a pivotable housing component (window)
111b pivotable housing component (window)
112 drawer
113 cap drawer
120 laboratory instrument unit
121 processing unit
130 sample container input station
131 sample container input station window
132 sample container input station access element
133 flap door
134 identification means
140 sample container output station
141 sample container output station window
142 sample container output station access element
150 sample container input-output station
151 SEL ("Single Error Line")
1511 transition area
1512 loading cup
1513 conveyor drive
1514 tensioner pulley
1515 init sensor
152 input-output slot (interface)
153 (optional) confirmation means (button)
160 workbench
160a workbench part
160b workbench part
161a hinge 161b hinge
170 screen
171 articulated arm
200 error sample container
300 method
310 execution step
320 decision step
330 execution step
340 execution step
350 execution step
360 execution step
370 decision step
380 execution step

DETAILED DESCRIPTION

In FIG. 1, a self-contained automated laboratory system 100 is shown in the form of a schematic perspective illustration viewed from the upper right side, wherein the laboratory system 100 is illustrated in a closed state. In general, FIGS. 1 to 6 illustrate the same specific embodiment of an automated laboratory system 100 in different opening states, i.e. in different states of the automated laboratory system 100 in which an openable multi-part housing component 111 of a housing 110 in the form of a double-winged window is either closed or opened to certain extents (certain pivoting angles). Here, the housing 110 is substantially manufactured from metal sheets, aluminum profiles and Plexiglas which is used for the windows of the housing 110 as well as the side walls, if desired, wherein each respective Plexiglas window, for example of each of the wings of the multi-part housing component 111, allows an inside view into the housing 110. The dimensions of the housing 110 of the laboratory system 100 can be chosen to lie within about 2800 mm×about 1500 mm×about 1900 mm.

The laboratory system 100 comprising the housing 110 accommodates at least one laboratory instrument unit 120, or alternatively a plurality of such laboratory instrument units arranged next to each other, provided to execute processing steps on a biological sample usually contained inside a sample container (not shown), such as a sample tube, a sample vial or the like. Here, a laboratory instrument unit 120 is to be understood as a technical unit including at least one laboratory instrument, e.g. an instrument and specimen processing equipment to perform clinical assay with only minimal involvement of a operator of the laboratory system 100, such as fully automated molecular testing instruments designed for blood screening, viral load monitoring and/or microbiological testing. Examples of such laboratory instrument units 120 are tube or rack loading/unloading units, transporting units, an identification unit and/or a liquid processing unit. Such a liquid processing unit as is implemented in the presently described embodiment of the present invention comprises a pipetting device and/or a thermal treatment device and/or a shaking or vortexing device. Also, a processing unit 121 provided inside the laboratory instrument unit 120 may furthermore also be referred to as an analytical unit 121, e.g. a clinical chemistry unit or nucleic acid analytics unit, such as a thermocycler, or immunochemistry unit, or a sample preparation unit, e.g. a sample preparation unit comprising a magnetic separation station.

A sample container can be introduced into the housing 110 of the laboratory system 100 by means of a sample container input unit or sample container input station 130, and can be discharged from the housing 110 by means of a sample container output unit or sample container output station 140. In the present embodiment as shown in FIGS. 1 to 6, the sample container input station 130 and the sample container output station 140 are illustrated as two separate stations or units of the laboratory system 100. However, in an alternative embodiment, the sample container input station 130 and the sample container output station 140 can be realized as one combined station into which the sample containers can be loaded, for example by means of sample container trays, and from which the processed sample containers can be unloaded. Thereby, only one loading/unloading interface has to be realized in the laboratory system 100, simplifying a loading/unloading process for the operator.

Figure 10:
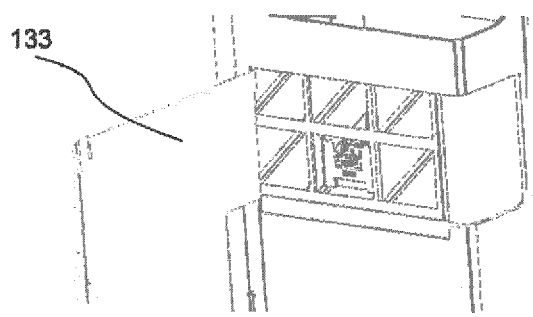
FIG. 10 is a schematic perspective illustration of a loading section of a sample container input station of the laboratory system as shown in FIGS. 1 to 7.

In general, the primary sample handling is the main task of the laboratory system 100, wherein all primary samples are stored in respective sample containers which, again, are stored in a tray or the like. However, adding priority (STAT) samples to the input might be possible. The tray can be manually loaded into the sample container input station 130 and unloaded from the sample container output station 140 by the operator, wherein each of the sample container input station 130 as well as the sample container output station 140 comprise access elements 132, 142, for example in the form of double-winged doors or gates on opposing sides of the housing 110, in order to allow access to the respective station 130, 140. Here, such access elements 132, 142 can be required for the operator to be able to enter the housing 110 of the laboratory system 100, for example during maintenance or in case of a technical problem. Also, the sample container trays can be loaded or unloaded by means of the access elements. Each of the sample container input station 130 and/or the sample container output station 140 can also be provided with a gate mechanism for solely loading and/or unloading the tray of sample containers or single sample containers, the gate mechanism comprising a closeable interface between the inside of the housing 110 and its outside, exemplary shown for the sample container input station 130 in the form of a simple flap door 133 or several flap doors 133 for each slot, see FIGS. 1 and 2. Also, in FIG. 10, the embodiment with a single flap door 133 is illustrated in an open position, wherein the loading slots including a tray with sample containers is also illustrated. Here again, each loading slot and each unloading slot can be provided with a respective flap door 133, resulting in several flap doors next to each other. In general, the laboratory system 100 has a specified overall storage capacity in order to maximize the walk away time of the operator.

Besides the windows of the multi-part component 111, the sample container input station 130 as well as the sample container output station 140 comprise respective windows 131, 141 on the same side of the housing, in order to allow inside view of the respective station 130, 140. Similar thereto, the window wings of the multi-part housing component 111, i.e. the window in each of two pivotable housing components 111a, 111b of the multi-part housing component 111 provide inside view of the laboratory instrument unit 120 as well as a sample container input-output station 150. Furthermore, the housing 110 also includes several transport means 103, 104, 105, for example in the form of a chain mechanism, a rack shuttle or a tube gripper, or the like, for transport of the sample container from the sample container input station 130 to the laboratory instrument unit 120, carried out by transport means 103, and further to the sample container output station 140, carried out by transport means 104 and/or 105. In particular, there can be different types of transport means or transport units provided inside the laboratory system 100 of the present invention, see also FIG. 7: A first type of transport means 103 in the form of a tray shuttle or the like pulls in trays comprising the sample containers from one or several slots of the sample container input station 130, which slots can be covered on the outside of the housing by flap door 133, and transports them, for example, to a workflow deck, i.e. an internal processing unit 121 inside the laboratory system 100. Then, a second type of transport means 105 in the form of a tube gripper transports the containers out of the trays and moves the sample containers over the workflow deck and to and from one or several analytical instruments for processing the sample, and finally, after processing the samples, places the sample containers in respective trays. The transport means 105 in the form of a tube gripper can be a robotic arm movable in any direction, which is indicated—at least for the horizontal plane—by the illustrated crossed arrows in FIG. 7, wherein a vertical movement can also be implemented. Moreover, a third type of transport means 104 in the form of another tray shuttle transports the trays including the processed sample containers to the sample container output station 140.

Figure 7:
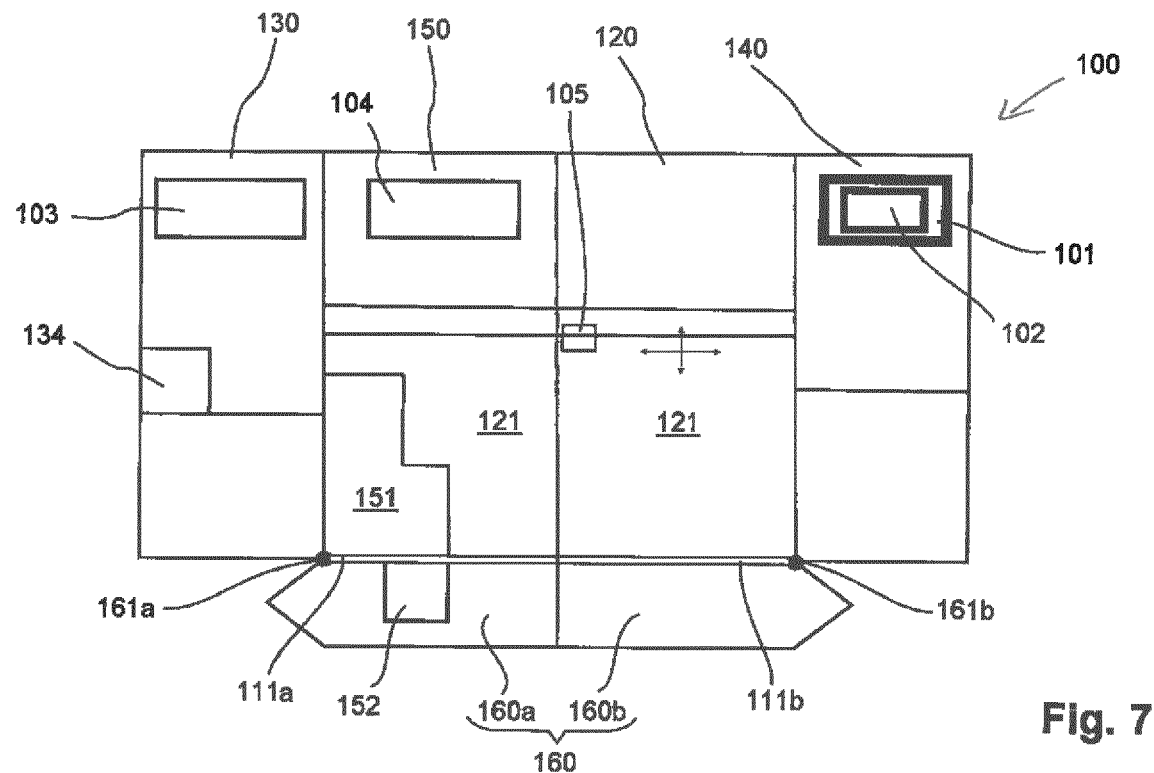
FIG. 7 is a schematic cross-section of the laboratory system as shown in FIGS. 1 to 6 in which the inside of the laboratory system is illustrated with regard to the relevant components.

The above described workflow can only be carried out without disturbance when the samples as well as the sample containers do not cause a control unit 101 inside the housing 110, see FIG. 7, to generate any kind of error identification. Here, the control unit 101 can comprise a computer CPU 102 or the like, containing application software for carrying out workflow control and error identification of the laboratory system 100, wherein an error can occur in the form of incorrect labelling of a sample container, which error identification can be carried out by a camera automated sample container check. Accordingly, the application software running on the CPU 102 receives sample information from an identification means 134, such as a camera. Here, during the automated check, the identification means 134 in the form of a camera takes pictures, for example of a barcode or the like, and analyzes the same for sample container information. In case the sample information can not be found, can not be read, or contains unidentifiable information, the CPU 102 generates an internal error message which activates error handling in the form of removing the sample container from the workflow by means of transport means 103.

In general, error identification as described above can be based on a determination that the biological sample and/or the sample container is not in a condition to be processed by the laboratory instrument unit 120. In such case, i.e. in case the control unit actually identifies a sample container or the sample contained therein to be not in a processable state, the identified sample container will be treated as error sample container 200, i.e. as a sample container 200 determined to be not in a condition to be processed by the one or more laboratory instrument units, and is transported by the transport means 105 to the sample container input-output station 150 serving as component for achieving direct relation between the workflow inside the laboratory system 100 and the operator.

Accordingly, in such an error case, the laboratory system 100 distinguishes between (a) a sample container related error or "sample container error", such as an incorrect labelling of the sample container, an unreadable barcode on the sample container, or the like, (b) a sample related error or "sample error" such as the occurrence of clots in the samples, too much or too little sample liquid in the sample container, or the like, and (c) system related errors, wherein sample errors or sample container errors have to be sorted out for manual processing or disposal. Here, for the sake of easier reference, the "sample container 200 determined to be not in a condition to be processed by the one or more laboratory instrument units" is also be referred to as "error sample container" 200.

In further detail, the sample container input-output station 150, which is arranged between the sample container input station 130 and the sample container output station 140, and more specifically between the sample container input station 130 and the laboratory instrument unit 120, receives the error sample container 200 from the transport means 105 within a so-called error handling area of the sample container input-output station 150. Such a tube handler can be implemented in the form of an automated gripper, such as a robotic arm or the like, which includes the error sample container 200 into a receiving portion of a transition area 1511 of the sample container input-output station 150 inside the housing 110, which transition area 1511 serves as a buffer zone for the received error sample containers 200, see also FIG. 8.

Figure 8:
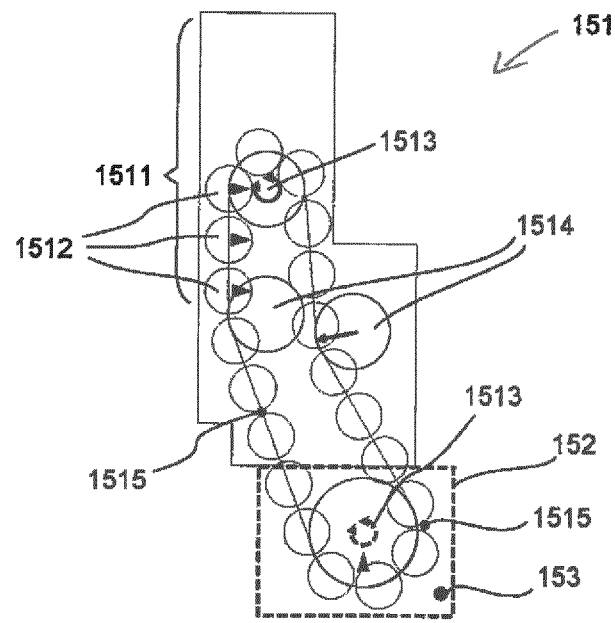
FIG. 8 is a schematic illustration of the functional structure of a "Single Error Line" provided inside a sample container input-output station of the laboratory system as shown in FIGS. 1 to 7.

As further illustrated in the schematic illustration of FIG. 8, the transition area 1511 of the sample container input-output station 150 leading up to a input-output slot 152 of the sample container input-output station 150 constitutes the beginning of a so-called Single Error Line "SEL" 151, which comprises a loading area comprising three exemplary loading cups 1512 in which the error sample containers 200 can be loaded, and from which the error sample containers 200 are transferred further, by means of the illustrated conveyor, such as a chain conveyor or the like, driven by at least two conveyor drives 1513 and kept under tension by at least two tensioner pulley 1514. In the sample container input-output station 150, sample container presence sensors can be provided, exemplary illustrated by three triangles at the respective loading cups 1512 as well as in the input-output slot 152. Regarding the further course of the conveyor, the error sample containers 200 are transferred from the loading area to the input-output slot 152, from which an operator, such as a laboratory assistant or laboratory technician, can retrieve the error sample containers 200. As further sensory assistance, init sensors 1515 are provided, which can be used in order to determine the presence/absence of sample containers, or which can also be used in order to determine if an outer door of the input-output slot 152 is open or closed, and the like. All sensors can provide the respective sensory data to the control unit 101 for monitoring.

According to FIG. 8, several error sample containers 200 can be placed inside the input-output slot 152 for removal. However, according to the presently described embodiment, only one single error sample container 200 is supposed to be placed inside the input-output slot 152, in order to the operator to not be in the position to choose between several provided error sample containers 200. Accordingly, the SEL 151 allows the direct sample output to the operator without the need of breaching the enclosure of the laboratory system 100, wherein the chain conveyor of the SEL 151 transports the error sample containers 200 through the transition area 1511 of the sample container input-output station 150 to the input-output slot 152 serving as an interface between the inside and the outside of the housing 110, i.e. transfers single error sample containers 200 from within the laboratory system 100 to the transition area 1511 and then hand the same out to the operator at the input-output slot 152. After the error is solved manually by the operator, the corrected sample container has to be placed back into the input-output slot 152 adapted to hold a single sample container at a time. Afterwards, the SEL 151 returns the corrected sample container to the part of the transition area 1511 inside the housing 110 where it is handed over to the tube handler 105. Thus, according to the presently described embodiment, the overall SEL capacity can be 20 pieces, up to 3 error sample containers 200 can be loaded into the receiving part of the transition area by the tube handler at the same time, and one single error sample container 200 can be presented to the operator in the input-output slot 152. Due to such a big transition area 1511, the tube handler is able to place several error sample containers 200 into the SEL 151 in parallel at the same time. This has a positive effect on a throughput rate of the workflow inside the laboratory system 100. Here, as examples of containers usable for the SEL 151, a container diameter variety of about 12 mm to 16 mm for primary and secondary tubes, about 27 mm for SurePath, about 34.5 mm for PreservCyt, and about 42 mm to 44 mm for typical primary urine cups can be applicable.

In the specific embodiment as illustrated in FIGS. 1 to 8, the input-output slot 152 functioning in the manner of an airlock comprises an automated door mechanism including the outer door as mentioned above, for providing the operator access to a single error sample container 200 received from the transition area 1511 and positioned inside the input-output slot 152. A schematic perspective illustration of an input-output slot 152 of a sample container input-output station 150 for providing the operator access to a single error sample container 200 can be gathered from FIG. 9, in which the single error sample container 200 is positioned in the open outer door of the input-output slot 152. Accordingly, with the single error sample container in- and output function of the input-output slot 152, error sample containers 200 are presented to the operator in a sorted order, one by one, to provide user convenience. Also, with the presentation of only one single error sample container 200 to the operator at a time, it is possible for the operator to focus on just one single sample, and to allow a clear match between received information, for example on screen 170, and the respective physical error sample container 200, without the possibility of confusion of error sample containers 200 and respectively provided information. Accordingly, sorting of error sample containers 200 or intelligent steering or resolution of respective errors is made possible to the operator, since a separation of different "error types" can be achieved within the transition area of the SEL 151 that buffers all the error sample containers 200.

Figure 9:
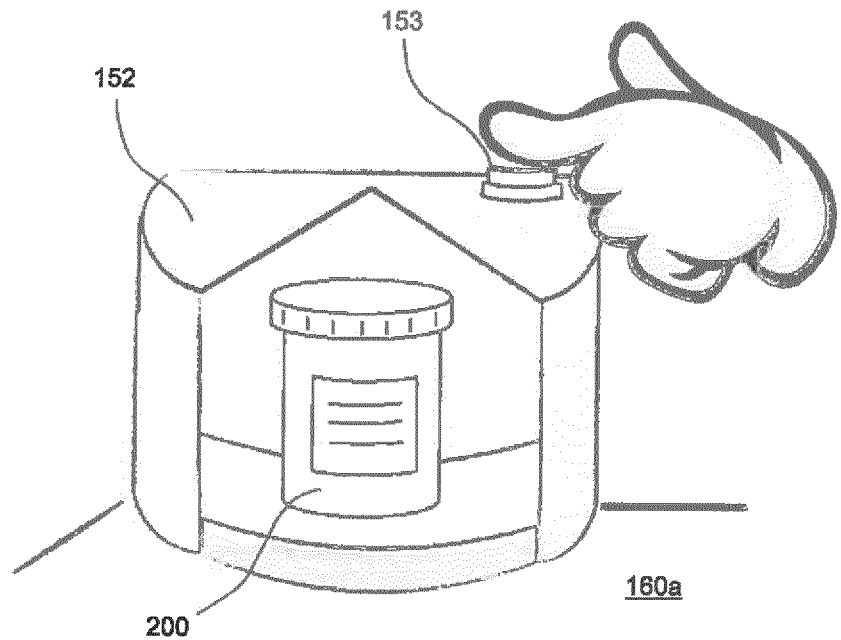
FIG. 9 is a schematic perspective illustration of an input-output slot of the sample container input-output station of the laboratory system as shown in FIGS. 1 to 7, with an operator's hand actuating an optional confirmation button.

For the above described reason, the input-output slot 152 of the sample container input-output station 150 can also comprise the init sensor 1515 as shown in FIG. 8 inside the input-output slot 152, such as an optical sensor or the like, inter alia for determining the presence of the error sample container 200 in the input-output slot 152, i.e. in the area between the outer door and an inner door of the input-output slot 152. Here, for example, the control unit 101 will only open the outer door of the input-output slot 152 in case the error sample container 200 is positioned in the input-output slot 152 and the inner door is closed. As can be gathered from FIGS. 4, 8 and 9, the input-output slot 152 can also comprise a confirmation means in the form of an optional hardware confirmation button 153 for providing an operator with a possibility for giving a feedback to the control unit 101 regarding the error sample container 200. In FIG. 9, the operator's hand 300 is in the course of pressing the confirmation button 153. As an example, the operator can press the confirmation button 153 once as confirmation that the error sample container 200 is actually positioned inside the input-output slot 152 before taking the same therefrom for manual processing, and the operator can press the confirmation button 153 again once as confirmation that the error sample container 200 is returned inside the input-output slot 152 after manual processing of the same, wherein the init sensor 1515 inside the input-output slot 152 can serve as further confirmation that the error sample container 200 is actually returned into the input-output slot 152. Such an optional hardware button 153 also provides an ergonomic means for confirmation of the solved error and can prevent contamination of any user interface, such as a touchscreen or the like, after working with a biological sample. In case the error sample container 200 has been disposed of by the operator, for example into a waste bin which can be provided in one of several drawers 112, the operator can also press the confirmation button 153, and a following negative determination by the init sensor 1515 inside the input-output slot 152 can serve as "negative" confirmation, i.e. a confirmation that the error sample container 200 has not been returned into the input-output slot 152, and, thus, has been disposed, without the need of further processing. Of course, as an alternative to the hardware confirmation button, a virtual confirmation button can be implemented in the form of a respective software implementation on the touchscreen. Accordingly, based on the provided sensors 1515 in the laboratory system 100 as described above, the laboratory system 100 can check presence and/or position of error sample containers 200 as well as the open/close status of the door of the input-output slot 152 automatically.

As further component, the laboratory system 100 of the present specific embodiment comprises a working surface in the form of a pivotable workbench 160 as integral part of the housing 110 of the laboratory system 100, wherein the workbench 160 is arranged directly at the input-output slot 152. In further detail, the workbench 160 provides a table for work instruments and the like, and a working space in order to be able to process the error sample container 200 directly at the input-output slot 152. Further, in case the automated workflow inside the laboratory system 100 requires additional "manual" processing steps, the workbench 160 and the input-output function of the input-output slot 152 provides a respective simple and fast solution. Also, in case the workbench 160 is designed to be height-adjustable, the workbench 160 provides an ergonomic workspace for the operator when required to carry out manual processing of an error sample container 200. In the presently described specific embodiment as shown in FIGS. 1 to 7, the workbench 160 consists of two halves or two workbench parts 160a, 160b dividing the workbench in half, meaning that the workbench 160 can be separated in its middle, if desired, into the left workbench part 160a and the right workbench part 160b. Here, one of the workbench parts 160a, 160b, namely the left workbench part 160a is provided adjacent to and directly underneath the input-output slot 152, wherein an outer casing of the input-output slot 152 can be attached to the housing 110 as well as to one of the workbench parts 160a, 160b to be an integral part of these components. Further, due to the fact that the workbench 160 is attached to the housing 110, or, in more detail, to the two pivotable housing components 111a, 111b of the multi-part housing component 111, i.e. the left workbench part 160a is attached to the left housing component 111a and the right workbench part 160b is attached to the right housing component 111b, the workbench parts 160a, 160b can be pivoted to the outside integrally with a pivoting movement of the respective housing component 111a, 111b, and, thus, together with the outer casing of the input-output slot 152, while items arranged on the workbench 160 can remain on the workbench parts 160a, 160b during and after pivoting. The pivoting movement of the workbench parts 160a, 160b is achieved by means of hinges 161*a*, 161*b*, as shown in FIG. 7, wherein the left-side hinge 161*a* is provided between the housing 110 and the pivotable housing component 111*a* connected to the workbench part 160*a*, and wherein the right-side hinge 161*b* is provided between the housing 110 and the pivotable housing component 111*b* connected to the workbench part 160*b*.

Accordingly, the workbench parts 160*a*, 160*b*, respectively, turn sideways along with the respective pivotable housing component 111*a*, 111*b* when pivoting the same to the outside. Thereby, the housing 110 can be opened by pivoting the housing components 111*a*, 111*b* to the outside, in case the operator is required to enter the laboratory system 100 for maintenance, troubleshooting, or the like, leaving the work space on top of the workbench 160 unaffected. For example, in case of spilled sample liquids inside the housing 110, the operator can open the multi-part housing component 111 in the manner of a double-winged door, since each pivotable housing component 111*a*, 111*b* is provided in the form of a housing door or housing window, as already described earlier, constituting a double-winged door or double-winged window. With opening the same, the operator can gain access to, for example, the SEL 151 for maintenance, wherein guiding rails, studs as well as any kind of sample container holder, which can also be provided with a quick-release-lock system inside the chain mechanism, can be disassembled in a simple manner without using a tool in order to be able to carry out cleaning activities, such as wiping by means of pipe cleaners, or the like. Therefore, the possibility to turn the workbench parts 160*a*, 160*b* along with the respective pivotable housing component 111*a*, 111*b* sideways without the need of removing anything from the multi-part workbench 160 first, i.e. working instruments may remain on the workbench 160, results in an optimal access of the housing 110. A reasonable size for the workbench 160 in view of the possible overall size as described before can lie within about 1300 mm to 1700 mm×about 300 mm to 400 mm. Such size of the workbench 160 allows for sufficient workspace for manual processing work of the operator in order to be able to deal with erroneous sample containers 200 ("unhappy samples") right at the input-output slot 152, i.e. the interface between the inside and the outside of the housing 110 at the sample container input-output station 150.

As another functional component, the laboratory system 100 of the present specific embodiment comprises the screen 170 for providing the operator with detailed information about the condition of each sample container and its biological sample, and thereby also about the condition of each identified error sample container 200. In the present specific embodiment, the screen 170 can be a combination of a man-machine interface, such as a touchscreen, and electroacoustic transducers, such as speakers or microphones, wherein other sensors, such as optical sensors can also be implemented in order to enhance operator-system interface activity. Furthermore, the screen 170 can be mounted on the housing 110 in a swivel-mounted manner by means of an articulated arm 171 connected on top of the housing 110 in a rotatable manner. Thereby, it is possible to position the screen 170 in front of the operator when the same is positioned at the workbench 160, in order to improve the visibility of the information shown on the screen 170 to the operator when the same is manually processing the error sample container 200 on the workbench 160. Thereby, i.e. by providing the screen 170 in front of the operator to provide detailed information of the error sample container 200, a close interaction space in the manner of a compact work station or an "error handling cockpit" can be achieved, resulting in a fast and efficient way of processing error sample containers 200. Accordingly, by means of the articulated arm 171, the screen 170 can be swiveled around the housing of the laboratory system 100, wherein such a swiveling movement of the screen 170 can be gathered when comparing the spatial position of the screen 170 in FIG. 1 compared to FIG. 3, and a turnability of the screen 170 around its own axis can also be achieved, as can be gathered when comparing FIG. 3 and FIG. 4. Also, by means of a sliding mechanism inside the articulated arm 171, the positional height of the screen 170 can also be changed, which is schematically suggested by the quick release handle provided on the articulated arm 171, see FIGS. 1 to 4.

Moreover, in order to facilitate any manual processing on the workbench 160 for the operator, several drawers 112, 113 are provided in the housing 110 adjacent to the workbench 160 in a retractable manner, for example below the workbench 160 or also on each side of the workbench 160. As an example, in FIG. 3, one drawer 112 is shown in an opened position, i.e. one of the drawers 112 provided on the right front side of the laboratory system 100, immediately underneath the workbench 160 to the right. The drawers 112, 113 provide sufficient space for needed devices, such as work instruments required to solve the error of each error sample container 200, or caps for the sample container, as is the case for cap drawer 113 as depicted separately from the other drawers. Accordingly, each drawer 112, 113 is adapted to provide necessary laboratory devices and utilities, such as the already mentioned caps, or also manipulation devices to be used by the operator for manipulating the biological sample and/or the vessel of the error sample container 200. Furthermore, one of the drawers 112 can also provide a waste bin in case it is decided by the operator to dispose of the error sample container 200. Also, instead of the separate drawers 112 provided one above the other as depicted in, for example, FIG. 2, one large drawer extending over the entire range of the separate drawers 112 can also be provided as an alternative embodiment.

Figure 11:
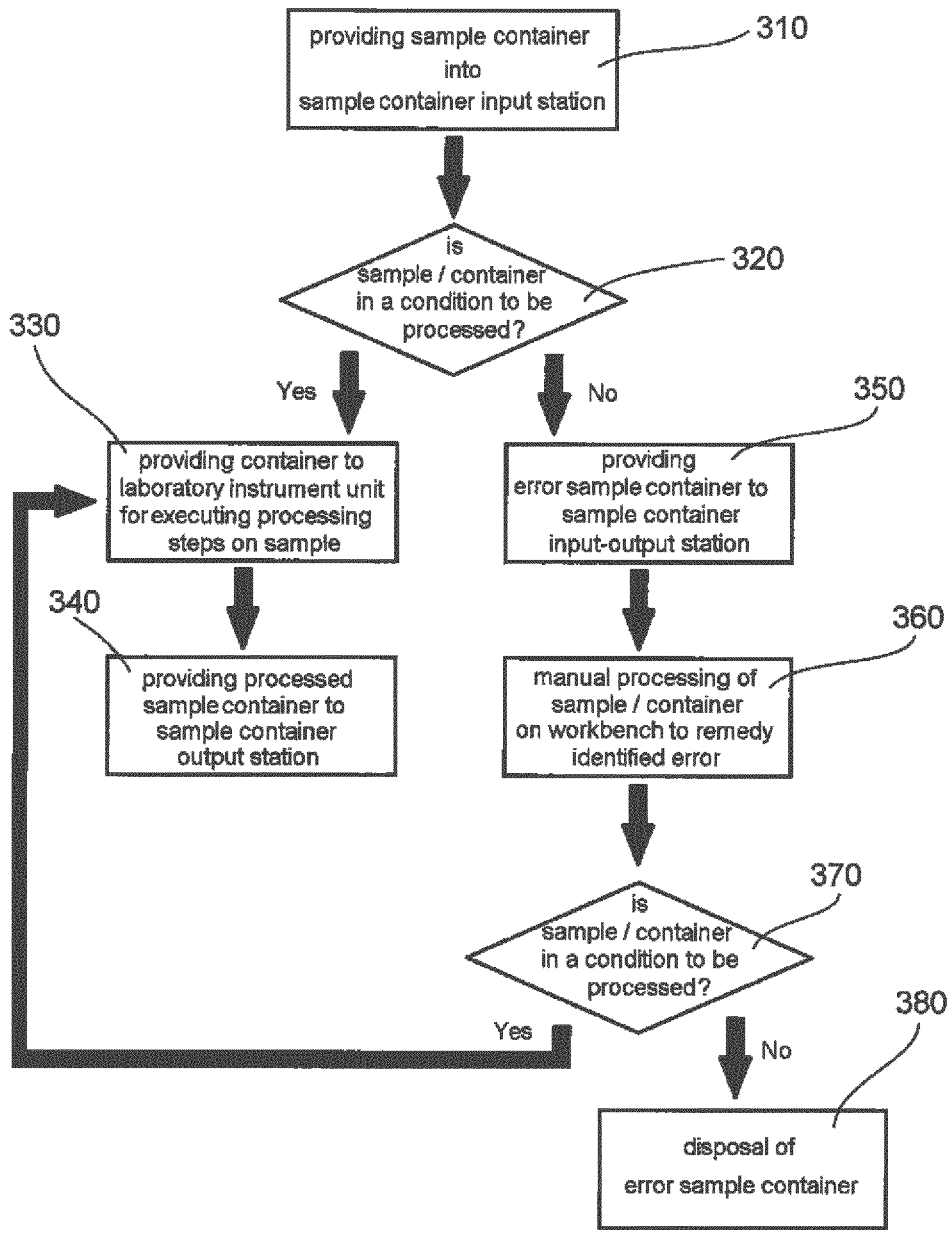
FIG. 11 is a flowchart illustrating an embodiment of a method of the present invention.

As illustrated in FIG. 11, a method for processing a biological sample provided in a sample container by means of the laboratory system 100 as described above is also part of the present disclosure, wherein the components or units of the laboratory system 100 and the operational steps mentioned in their context in regard to the structure of the above described laboratory system 100 also apply for the method of the present invention and are, thus, not repeated at this point. In further detail, the method 300 comprises the following steps, which can be arranged in the following order in line with the flowchart of FIG. 11:

Execution step 310: Providing, by the operator, one or more sample containers with a biological sample each into the sample container input station 130.

Decision step 320: Determining, by means of the control unit, whether the biological sample and/or the sample container is in a condition to be processed by the laboratory instrument unit 120.

Execution step 330: In case the determination in decision step 320 is positive, i.e. the biological sample and/or the sample container is determined in decision step 320 to be in a condition to be processed by the laboratory instrument unit 120, providing the sample container to the laboratory instrument unit 120, by means of the transport means, for executing processing steps on the biological sample.

Execution step 340: After execution step 330, i.e. after executing processing steps on the biological sample by the laboratory instrument unit 120, providing, by means of the transport means, the processed sample container to the sample container output station 140.

Execution step 350: In case the determination in decision step 320 is negative, i.e. the biological sample and/or the sample container is determined in decision step 320 to be an error sample container 200, namely not in a condition to be processed by the laboratory instrument unit 120, providing the error sample container 200 to the sample container input-output station 150 and further to the input-output slot 152.

Execution step 360: Manual processing of the biological sample and/or the container itself by the operator on the workbench 160 of the laboratory system 100 in order to remedy the identified error.

Decision step 370: Determining, by the operator, if the manipulation by the operator in execution step 360 resulted in a remedy of the identified error, i.e. the biological sample and/or the sample container passing over into a condition ready for being processed by the laboratory instrument unit 120.

In case the determination in decision step 370 is positive, return of the sample container into the input-output slot 152, pressing the confirmation button 153, reintroduction of the sample container into the laboratory system 100, reintegration into the processing workflow, and proceeding to execution step 330.

Execution step 380: In case the determination in decision step 370 is negative, disposal of the error sample container 200 by the operator.

While the current invention has been described in relation to its specific embodiments, it is to be understood that this description is for illustrative purposes only. Accordingly, it is intended that the invention be limited only by the scope of the claims appended hereto. Indeed, various modifications in addition to those described herein will become apparent to those skilled in the art from the foregoing description and accompanying figures. Such modifications are intended to fall within the scope of the claims. Various publications are cited herein, the disclosures of which are incorporated by reference in their entireties.

The invention claimed is:

1. A laboratory system for automatically processing at least one sample container containing a biological sample, the laboratory system being self-contained and comprising:
   a housing in which the laboratory system is self-contained;
   one or more laboratory instrument units provided within the housing and configured to execute processing steps on said biological sample;
   a sample container input station for loading said at least one sample container into the laboratory system, the sample container input station being configured to receive said at least one sample container;
   a sample container output station provided as an interface in the housing, through which said at least one sample container can be discharged after processing;
   a transport means provided inside the laboratory system and configured to transport said sample container from the sample container input station to the one or more laboratory instrument units, and further to the sample container output station, the transport means comprising a tube gripper with a movable robotic arm;
   a control unit for carrying out workflow control and error identification of the laboratory system, the control unit being configured to carry out error identification by determining whether said biological sample and/or said at least one sample container is in a condition to be processed by the one or more laboratory instrument units, and to control the transport means based on the determination result;
   a sample container input-output station separate from each of the sample container input and output stations, the sample container input-output station arranged between the sample container input station and the sample container output station and connected with the transport means, the sample container input-output station providing a second interface between the inside and the outside of the housing; and
   a workbench provided on the outside of the housing and in front of the sample container input-output station for an operator to be in the position to manipulate said biological sample and/or said at least one sample container determined by the control unit as not in the condition to be processed by the one or more laboratory instrument units during error identification;
   wherein, the transport means is further configured to transport a sample container determined by the control unit as error sample container during error identification to the sample container input-output station;
   wherein the sample container input-output station comprises a transition area, at least one chain conveyor, and an input-output slot as said second interface between the inside and outside of the housing, the input-output slot comprising a door mechanism and providing access to said at least one sample container transported by the at least one chain conveyor from the inside of the laboratory system through the transition area to the input-output slot;
   wherein the chain conveyor is further configured to deliver said at least one sample container from the input-output slot to a portion of the transition area inside the housing after an operator has accessed the at least one sample container; and
   wherein the transport means is further configured to retrieve the at least one sample container from the portion of the transition area inside the housing and transport the at least one sample container to the one or more laboratory instrument units for processing.

2. The laboratory system according to claim 1, wherein the workbench is a pivotable workbench integrated into the housing of the laboratory system, the workbench being pivotable about a fixed-point relative to the housing.

3. The laboratory system according to claim 2, wherein the workbench is adapted to pivot to an outside surface of the housing together with a pivotable housing component for the workbench being able to pivot while items arranged on the workbench remain on the workbench during and after pivoting.

4. The laboratory system according to claim 1, wherein the laboratory system further comprises a screen for providing the operator with detailed information about the condition of each sample container and its biological sample to be processed by the one or more laboratory instrument units, wherein the screen comprises a touch screen interface.

5. The laboratory system according to claim 4, wherein the screen is provided above the workbench as an integral part of the housing or as a separate component mounted on the housing.

6. The laboratory system according to claim 4, wherein the screen is mounted on the housing in front of the operator positioned at the workbench.

7. The laboratory system according to claim 4, wherein the screen is swivel-mounted on the housing by means of an articulated arm connected to the housing.

8. The laboratory system according to claim 1, wherein the door mechanism of the input-output slot comprises an automated door mechanism providing the operator access to said at least one sample container arranged in the input-output slot.

9. The laboratory system according to claim 1, wherein the input-output slot provides access to a single sample container.

10. The laboratory system according to claim 1, wherein the input-output slot comprises a confirmation means for providing the operator with a means for providing a feedback to the control unit regarding said sample container determined by the control unit as not in the condition to be processed by the one or more laboratory instrument units.

11. The laboratory system according to claim 1, wherein the input-output slot comprises a sensor means for determining the presence of at least one sample container in the input-output slot, the sensor means comprising at least one of a light barrier sensor, a camera, a physical switch sensor, or a contact sensor.

12. The laboratory system according to claim 1, wherein the control unit comprises an application software for receiving sample information from an identification means by reading a sample container identifier provided on said sample container associated with the contained biological sample by the identification means and transmitting information to the application software.

13. The laboratory system according to claim 1, wherein the transport means is adapted to transport several sample containers in a row from the sample container input station to the one or more laboratory instrument units, to the sample container input-output station and/or to the sample container output station.

14. The laboratory system according to claim 1, wherein the sample container input-output station is adapted to contain up to 20 containers.

15. The laboratory system according to claim 1, wherein the sample container input station is configured to receive different sample container types.

16. A method for processing at least one biological sample provided in a sample container by means of a laboratory system according to claim 1, the method comprising at least the steps of:

providing at least one sample container with a biological sample into the sample container input station;

determining whether said biological sample and/or said sample container is in a condition to be processed by the one or more laboratory instrument units, by means of the control unit;

if said biological sample and/or said sample container is in a condition to be processed by the one or more laboratory instrument units, providing said sample container to the one or more laboratory instrument units for executing processing steps on said biological sample; and if said biological sample and/or said sample container is not in a condition to be processed by the one or more laboratory instrument units, providing said sample container to the sample container input-output station for manipulation of said biological sample and/or said sample container by the operator on the workbench of the laboratory system.

* * * * *